Patented Jan. 9, 1934

1,942,491

UNITED STATES PATENT OFFICE 1,942,491

PAINT AND PIGMENT THEREFOR

Wendell G. Randolph, New York, N. Y., assignor to The Egyptian Lacquer Manufacturing Company, New York, N. Y., a corporation of New Jersey No Drawing. Application January 23, 1931
Serial No. 510,769

4 Claims. (Cl. 134—39)

This invention relates to paints, and the like, and has application also to allied coatings such as varnishes, enamels, shellacs, lacquers, and synthetic coating products.

The object of the invention is to provide means to overcome or prevent the separation in paints, varnishes, enamels, shellacs, lacquers, and the like, of the constituents composing the pigments thereof.

The invention consists of a paint or the like in which the pigment constituents are held together by a colloidal binder insoluble in the medium in which the pigment is used.

More particularly, the invention will be more fully apparent from the following:—

In many industries where a paint or the like is used in which more than one pigment is utilized, the action of gravity or some other force such as electrical attraction or repulsion or partial solubility of one of the components has caused a separation of one pigment from the other. This separation has caused a stratification of the pigments, sometimes called floating or flooding. The objectionable effect of this is the difference in color or general appearance of the article to which the coating is applied. So, for instance, a gray produced by a white pigment and a black pigment, or a green produced by a mixture of chrome yellow pigment and iron blue pigment, it has been found that the black component of the gray has a tendency to float, and that the blue component of the green will float and the yellow component thereof will sink, the result in many cases being that blue streaks, or darker green areas will show in the finished surface. Other combinations of pigments have shown similar results.

When, however, these components are joined by a colloidal binder, they are held together and thereby for each particle of gray, there will always remain securely bound together the respective components as the white and black pigments. Similarly, with each particle of green the binder will permanently join the components, as the yellow and blue. And likewise with other colors. The essential thing here is that the component pigments are permanently held together and are secured against separation or stratification. The second essential is that this binder should be partially and preferably completely insoluble in the other ingredients of the mixture in which the pigments are carried. Otherwise, the binding action would disappear as soon as the mixture of the medium in which the pigments are suspended is completed.

As a binding agent, glue or casein, may be used, or other water miscible colloidal material organic or inorganic, but these would be soluble in water, and so are not adaptable with water base paint, though satisfactory with other paints, varnishes, lacquers, and shellacs. Also cellulose type lacquers, such as those made of cellulose nitrate, or acetate; or resins, synthetic or otherwise or other colloidal materials, insoluble in the paint vehicle, may be used as binders. This can be introduced into the green pigment either during or after the process of manufacture of the green pigment. This may then be dried, or otherwise treated, as is customary in the pigment industry, and then introduced into the paint formula, which has no constituent to dissolve the binder. It has been found that the binding agent holds the respective components so securely as to prevent their separation and thus carry out the very object of compound pigments as heretofore intended but not heretofore accomplished. Also, a binding agent of nitrocellulose lacquer has proven satisfactory with a chrome green pigment, and this can be used in water base and oil base paints without floating. However, if this pigment bound by this binder is used in a nitrocellulose lacquer, then a redissolving of the binder will take place, and the tendency of the blue component to separate will again become apparent.

In the preparation of pigments for use, the several components constituting the compound pigment are joined with the binder, be it glue, casein, nitrocellulose, lacquer or resin solution, and then dried, powered in the manner well known to the pigment industry, and marketed as a usual article of commerce. It may be a paste or lumps, if the trade does not demand powder, but in any event, each particle, so to say, is not to be merely a juxtaposition of the component pigments, but a joining of the same by a binder so that the components remain joined when mixed with the ingredients composing the paint, whether water base or oil, lacquer, shellac, varnish, or the like. In each case also the binder selected would be such that it is insoluble in the surrounding medium in which the compound pigment is used. The colloidal binder used partakes also of the nature of a coating, a thin film covering not only the inner spaces of the pigment but also the surface. It has been stated in the literature that one of the causes of floating of the blue in a green pigment paint is the solubility of the blue in the paint vehicle. This has been overcome by the addition of the binding material which forms a coating and prevents solution.

As examples:—

A quantity of "Chrome green dark" pigment was moistened thoroughly with a thin solution of ½ second nitrocellulose. The mass was spread out in a pan and dried in an oven.

Another portion of the pigment was moistened with a glue solution and dried in the same manner to obtain another mass with a colloidal binder and coating agent.

The amount of dry nitrocellulose and dry glue was 3% of the weight of pigment.

These treated pigments were made into baking enamels by grinding 1½ pounds of the prepared pigment to 1 gallon of varnish.

When sprayed on plates and baked, these enamels showed no evidence of floating.

Shellac, is a colloidal gum; lacquer utilizes nitrocellulose; varnish utilizes gum and oils; and so these can be used as binders since each contains a colloidal constituent. Each, or a mixture thereof, could be used to mix with a compound pigment, and then the solvents removed, whereby the components of the compound pigment would be held by the colloidal binder; then the composite mass consisting of the respective components forming the compound pigment and the colloidal binder can be dried, ground into powder, etc. Also certain gums are water insoluble, and this again enables them to be used as binders in water base paints.

I have described a gray and a green and their components, but brown, formed of orange and black, and any and all color combinations can be used.

From the foregoing it will be seen that the invention consists in a paint, varnish, lacquer, shellac, or the like, utilizing compound color pigments in which the components of the compound pigment are held together by a colloidal binder permanently joining two or more elemental pigments, said binder being insoluble in the medium or body of the vehicle in which it is used.

I claim:

1. In the production of composite pigment, liquid coating compositions free from tendency to stratify, the process which comprises mixing at least two separate, finely ground, differently colored pigments in the presence of a small amount of a cellulose-type lacquer sufficient to bind the particles of said separate pigments together, drying the mixture, grinding without substantial separation of the differently colored pigment particles and dispersing into a liquid paint vehicle in which the dried residues of said lacquer are insoluble.

2. The process of claim 1 wherein the lacquer employed is a nitrocellulose lacquer which is used in proportions amounting to not substantially more than about 3 per cent by weight of the pigment.

3. A liquid coating composition comprising a vehicle and a composite pigment comprising at least two finely ground separate pigments dispersed in said vehicle, the particles of said composite pigment consisting of particles of the separate pigments bound together by a small amount of the dried residues of a cellulose-type lacquer; said residues being insoluble in said solution.

4. The composition of claim 3 wherein said dried residues are derived from a nitrocellulose lacquer and amount to not substantially more than about 3 per cent by weight of the pigment present.

WENDELL G. RANDOLPH.